J. L. De WITT.
Hay and Cotton Presses.

No. 165,076. Patented June 29, 1875.

WITNESSES:
G. Mathys
Colon A Kemon

INVENTOR:
Jno. L. DeWitt
BY
ATTORNEYS.

THE GRAPHIC CO.PHOTO-LITH. 39 & 41 PARK PLACE, N.Y.

UNITED STATES PATENT OFFICE.

JOHN L. DE WITT, OF GARDNER, ILLINOIS, ASSIGNOR OF ONE-HALF HIS RIGHT TO NELSON LA FORCE, OF SAME PLACE.

IMPROVEMENT IN HAY AND COTTON PRESSES.

Specification forming part of Letters Patent No. 165,076, dated June 29, 1875; application filed October 23, 1874.

*To all whom it may concern:*

Be it known that I, JOHN L. DE WITT, of Gardner, in the county of Grundy and State of Illinois, have invented a new and Improved Hay and Cotton Press; and I do hereby declare that the following is a full, clear, and exact description of the same, reference being had to the accompanying drawing, forming a part of this specification, in which—

Figure 1:
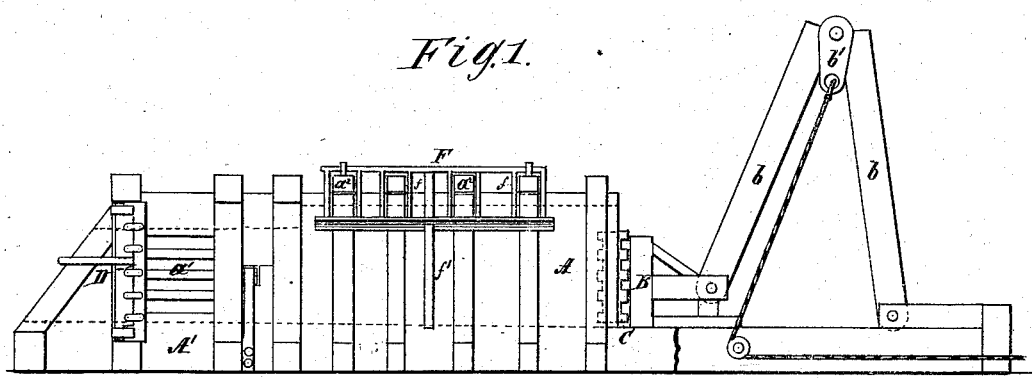
Figure 2:
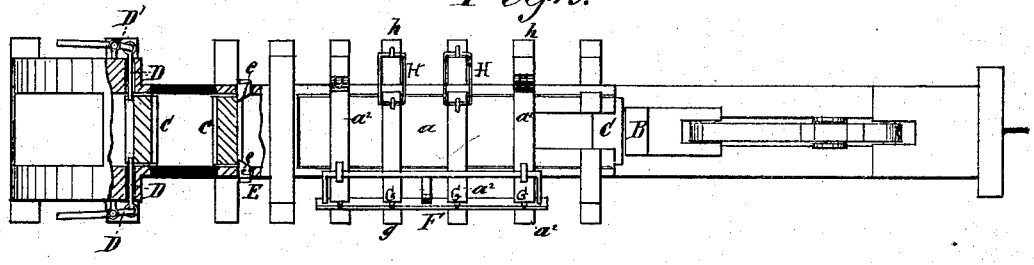

Figure 1 is a side elevation. Fig. 2 is a plan view, with a portion broken away.

The invention will first be fully described, and then pointed out in the claims.

A A' represent a press-box, and B the compressor-head—the former provided at the rear A with a hinged cover, $a$, which is raised to admit the loose hay or cotton, while the latter is operated by the toggle-arms $b$ $b$, actuated from the central joint-yoke $b'$ in any suitable manner. So far no novelty is claimed.

First, I lattice the bale end A' of the press-box at $a^1$ on each side, and the opposite faces of platen and follower are grooved, to allow the bale to be tied before removal. Second, I hold the platen by a slide or movable detainer-rods, D, hinged to a suitable handle and head, D', and preferably placed on the two opposite sides of box, so that the platen will be held during the act of compression, but afterward allowed to pass out with the bale. Third, I construct the follower C with V-shaped ribs or cleats, nailed across and parallel to each other on both its faces, grooves being thus formed, so that the tie-band can be readily passed from one side to the other of the box, and so that the cross-piece may serve both as a follower and platen. Fourth, I allow the follower, when pressed forward by the head B, to strike the incline $e$, and force back and pass a spring-catch, E, the latter then shooting out behind it, and preventing, by the perpendicular side, its retreat after the head is withdrawn. Fifth, I make the cross-bars $a^2$ of cover to project forward with their ends, and pivot to their top surface an open frame, F, which may have cross-bars $f$ and handle $f'$, the said frame passing over the projecting ends and locking on the upwardly-inclined pins G, made fast in the upright bars $g$ of press-box. This holds the cover very firmly in place on the front side. Sixth, at the rear side of cover I reenforce the hinges, which have a tendency to be loosened and injured, by a series of loops, H, that are hinged to the top bars $a^2$, and to a rear rod or upright bars, $h$. By this means the strain is readily taken without accident or the uprising of cover.

Having thus described all that is necessary to a full understanding of my invention, what I claim as new, and desire to protect by Letters Patent, is—

1. The combination, with press-box A and reciprocating head B, of loose pieces C, serving successively as follower and platen, in the manner described.

2. The combination, with unfastened follower C, of spring-catches E, having rear incline and perpendicular front face, as and for the purpose specified.

The above specification of my invention signed by me this 21st day of October, A. D. 1874.

JOHN L. DE WITT.

Witnesses:
SOLON C. KEMON,
W. W. HOLLINGSWORTH.